United States Patent [19]

Takahashi

[11] Patent Number: 5,507,371
[45] Date of Patent: Apr. 16, 1996

[54] DAMPING FORCE ADJUSTING DEVICE FOR DAMPERS

[75] Inventor: Koukichi Takahashi, Shizuoka, Japan

[73] Assignee: HKS Co., Ltd., Shizuoka, Japan

[21] Appl. No.: 362,111

[22] Filed: Dec. 22, 1994

[30] Foreign Application Priority Data

Jan. 11, 1994 [JP] Japan .................................. 6-12246

[51] Int. Cl.⁶ ........................................................ F16F 9/46
[52] U.S. Cl. .......................................... 188/299; 188/319
[58] Field of Search ................................. 92/85 R, 85 A, 92/85 B, 181 P; 188/319, 285, 299

[56] References Cited

U.S. PATENT DOCUMENTS

| 4,953,671 | 9/1990 | Imaizumi | 188/299 |
| 5,133,434 | 7/1992 | Kikushima et al. | 188/299 X |

FOREIGN PATENT DOCUMENTS

| 0237085 | 9/1987 | European Pat. Off. . |
| 0275368 | 7/1988 | European Pat. Off. . |
| 0346040 | 12/1989 | European Pat. Off. . |
| 69441 | 11/1958 | France . |
| 1012494 | 7/1957 | Germany . |
| 1260899 | 2/1968 | Germany . |
| 2353402 | 5/1975 | Germany . |
| 3503153 | 8/1985 | Germany . |

OTHER PUBLICATIONS

Patent Abstracts of Japan, vol. 14, No. 319 (M–996) [4262], 9 Jul. 1990 and Japan 02 107840 (Kayaba Ind. Co.), 19 Apr. 1990.

*Primary Examiner*—John E. Ryznic
*Attorney, Agent, or Firm*—Dvorak and Traub

[57] ABSTRACT

A main piston which divides the inside of a cylinder into chambers A and B has oil passages on the expanding side formed therethrough, and is mounted with a damping valve on the expanding side capable of closing the oil passages. The damping valve on the expanding side deforms in a deflecting manner to produce a damping force. A disc spring is disposed behind the damping valve on the expanding side to exert a biasing force on the rear face thereof. The disc spring is linked in an actuating manner to an operating rod mounted through a piston rod, thereby allowing a change of the biasing force exerted on the damping valve on the expanding side.

4 Claims, 2 Drawing Sheets

DAMPING FORCE ADJUSTING DEVICE FOR DAMPERS

BACKGROUND OF THE INVENTION

1. Field of the Invention

The present invention relates to a damping force adjusting device for dampers and particularly for hydraulic dampers.

2. Description of the Background Art

Japanese utility Model Registration Application Laid-open No. 3-12034 shows a hydraulic damper for automobile use equipped with a damping force adjusting device. In this device, a coil spring is disposed behind a damping valve mounted on a piston. An operating rod to change the displacement of the coil spring is provided in a piston rod fixed to the piston. Changing the displacement of the coil spring through the operating rod adjusts a biasing force exerted on the rear face of the damping valve by the coil spring, thereby changing the damping force produced by the damping valve.

Another prior art structure has a leaf spring instead of a coil spring and a biasing force exerted on the damping valve by the leaf spring is changed by adjusting the displacement of the leaf spring through the operating rod, thereby adjusting the damping force produced by the damping valve.

In the damping force adjusting device according to the first example of the prior art, the axial length of the coil spring is long, and the axial length of the hydraulic damper also becomes long with a resultant undesirable increase in the size of the hydraulic damper.

In the damping force adjusting device according to the second example of prior art, the load-displacement characteristic of the leaf spring shows a quadratic curve as shown in FIG. 3 hereof, later to be identified. This means that a load changes greatly in response to a small displacement of the leaf spring. As a result, a damping force produced by the damping valve also changes greatly. With this construction, it is difficult to set the damping force to a required value.

SUMMARY OF THE INVENTION

It is an object of the present invention to provide a damping force adjusting device for dampers which allows easy and positive external adjustment of a damping force in a compact design.

The present invention involves a damping force adjusting device for dampers, and has a cylinder capable of being filled with working fluid, a piston which is disposed in the cylinder in a slidable manner to divide the inside of the cylinder into two working chambers. The cylinder has passages formed therethrough for connecting the working chambers to each other. Damping valves are provided on the piston which can close the passages and which can produce a damping force as a result of being deformed in a deflecting manner by the working fluid flowing through the passages. A piston rod is fixed to the piston and projects outwardly from the cylinder. A disc spring is disposed behind the damping valve to exert a biasing force on the rear face of the damping valve. An adjusting rod is mounted through the piston rod and is linked to the disc spring to allow a change of the biasing force exerted on the damping valve by the disc spring.

In the damping force adjusting device for dampers according to the present invention, the biasing force is exerted on the damping valve by the disc spring which reflects the substantially proportional relationship between load and displacement. Hence it is possible to change the damping valve's damping force regulated by the disc spring's biasing force substantially in proportion to a displacement of the disc spring. As a result, the damping force of the damping valve can be easily and positively adjusted to a required value.

Moreover, the disc spring which exerts a biasing force on the damping valve is shorter in axial length than the coil spring. Accordingly, the disc spring disposed behind the damping valve does not necessitate an increase of the damper size, thereby allowing a more compact damper design.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Figure 1:
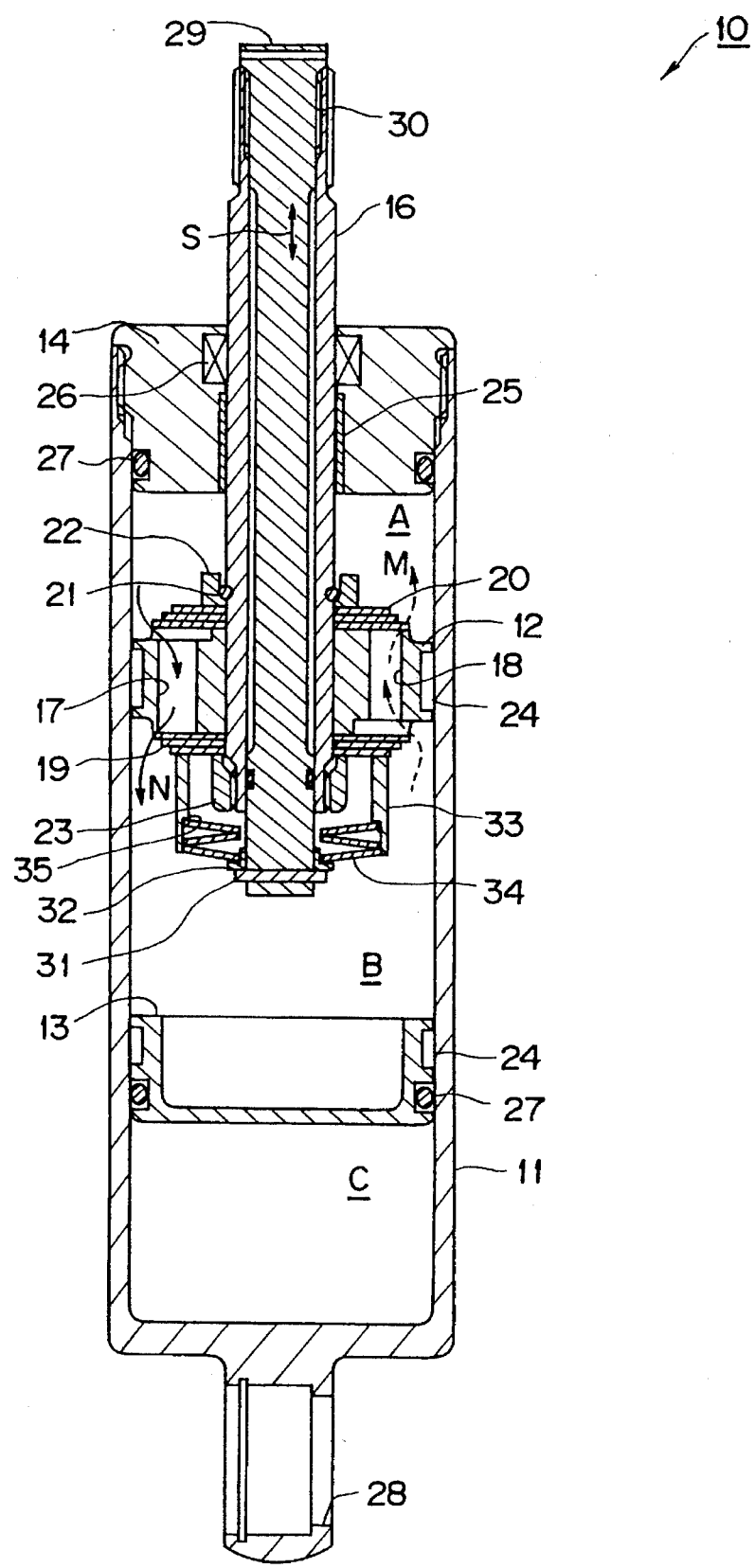
FIG. 1 is a cross-sectional view of a hydraulic damper illustrating a damping force adjusting device for dampers according to the present invention.

In a hydraulic damper 10 shown in FIG. 1, a main piston 12 and a free piston 13 are disposed in a slidable manner in a cylinder 11, and the opening of the cylinder 11 is plugged with a cylinder cap 14. The main piston 12 divides the inside of the cylinder 11 into chamber A and chamber B, and the free piston 13 separates chamber C from chamber B. Chambers A and B are filled with working fluid, and chamber C is charged with a gas such as nitrogen gas or the like.

A piston rod 16 extends through the main piston 12 at the central portion thereof and through the cylinder cap 14 and thus projects outwardly from the cylinder 11. Oil passages 17 on the expanding side and oil passages 18 on the contracting side are alternately cut through the main piston 12 around the piston rod 16. A damping valve 19 on the expanding side, blocks the oil passages 17 on the expanding side. It is mounted on a side face of the main piston 12. A damping valve 20 on the contracting side blocks the oil passages 18 on the contracting side, is mounted on the other side face.

A ring 21 is fitted to the piston rod 16 to support a valve retainer 22. A nut 23 is screwed on the end of the piston rod 16. The nut 23 and the valve retainer 22 fix the main piston 12, the damping valve 19 on the expanding side and the damping valve 20 on the contracting side to the piston rod 16 in an integral manner, and at the same time bring the damping valve 19 on the expanding side and the damping valve 20 on the contracting side in close contact with corresponding side faces of the main piston 12.

In the contracting stroke of the hydraulic damper 10, as illustrated with a dotted-line arrow M, the working fluid in chamber B flows through the oil passages 18 on the contracting side to cause the damping valve 20 on the contracting side to deform in a deflecting manner. The fluid then enters chamber A. In an expanding stroke of the hydraulic damper 10, as illustrated with a solid-line arrow N, the working fluid in chamber A flows through the oil passages 17 on the expanding side to cause the damping valve 19 on the expanding side to deform in a deflecting manner. The fluid then enters chamber B. The working fluid's forces which cause the damping valve 19 on the expanding side and the damping valve 20 on the contracting side to deform in a deflecting manner serve as a damping force on the expanding side and a damping force on the contracting side, respectively. The damping force is proportional to the working fluid's force which causes the damping valves 19, 20 to deform in a deflecting manner.

A piston ting 24 is fitted to the periphery of the main piston 12 and of the free piston 13 for easy sliding of both pistons 12 and 13. A guide 25 is fitted into the cylinder cap 14 to guide the piston rod 16 movement.

An oil seal 26 is fitted in the cylinder cap 14 to engage the piston rod 16. O-ring 27 is fitted to engage the cylinder 11. An O-ring 27 is also fitted to engage the piston 13 at its periphery. These oil seals 26 and O-rings 27 maintain liquid tightness for chamber A and chamber B.

The free piston 13 functions to accommodate as much volume of the working fluid as that of a portion of the piston rod 16 which enters chamber A in a contracting stroke of the hydraulic damper 10. Reference numeral 28 denotes an eye for mounting the hydraulic damper 10 to a vehicle on the axle side.

An adjusting rod 29 is mounted through the piston rod 16. The adjusting rod 29 is fitted to the piston rod 16 through an adjusting screw 30, and can effect an adjustment of the length of the piston rod 16 in an axial direction S. A pin 31 is fitted to the adjusting rod 29 at an end thereof in order to hold a spring retainer 32 in place. One or a plurality of disc springs 34 (3 disc springs in the present embodiment) are disposed one on top of another between the spring retainer 32 and a cage 33. The cage 33 has a cylindrical shape. The cage 33 abuts with the rear face of the damping valve 19 on the expanding side at an end thereof, and the disc springs 34 rest at a stepped portion 35 at the other end.

When an operating pin (not shown) or the like is inserted into a pin hole 36 at the other end of the adjusting rod 29 and when the adjusting rod 29 is turned with the pin, the adjusting rod 29 moves through the piston rod 16 in the axial direction S. This causes the disc springs 34 to be displaced axially (in the same direction as the axial direction S of the piston rod 16). This changes the biasing force exerted on the rear face of the damping valve 19 on the expanding side by the disc springs 34 through the cage 33 and thus changes the amount of the deflecting deformation of the damping valve 19 on the expanding side derived from the working fluid passing through the oil passages 17 on the expanding side. As a biasing force exerted by the disc springs 34 increases, a deflecting deformation of the damping valve 19 on the expanding side derived from the working fluid decreases with a resultant increase in a damping force on the expanding side of the hydraulic damper 10. As a biasing force exerted by the disc springs 34 decreases, a deflecting deformation of the damping valve 19 on the expanding side derived from the working fluid increases to produce a decrease in damping force on the expanding side of the hydraulic damper 10.

Figure 2:
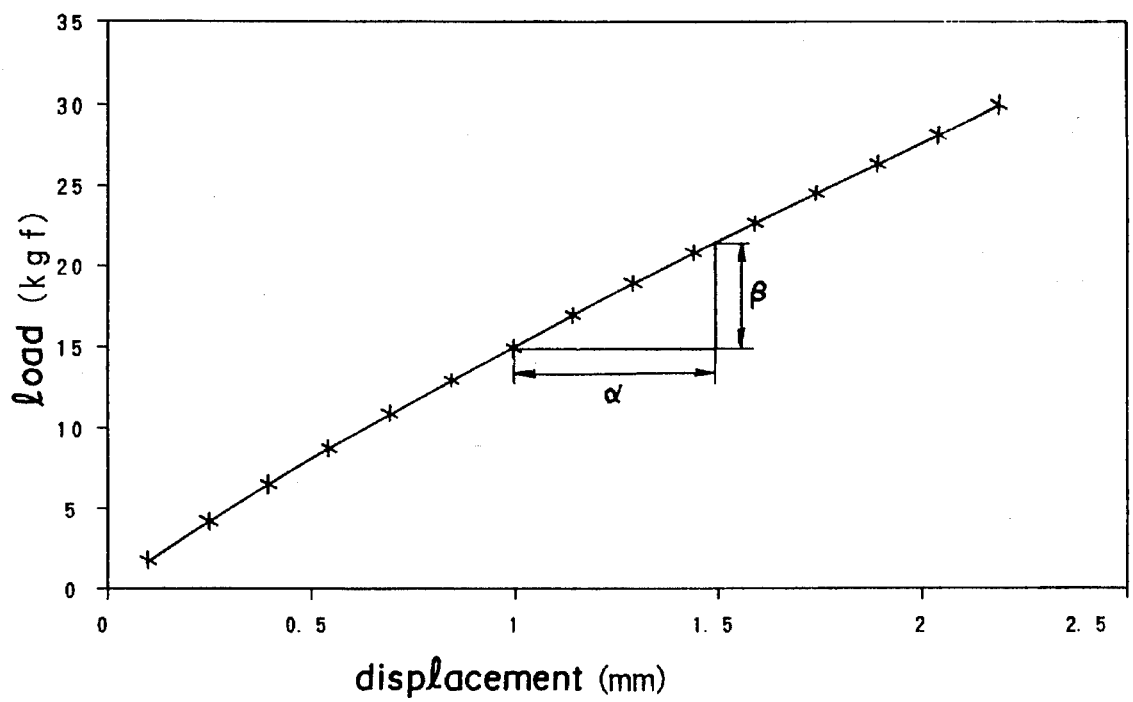
FIG. 2 is a graph illustrating the load-displacement characteristic of a disc spring in the hydraulic damper of FIG. 1.
Figure 3:
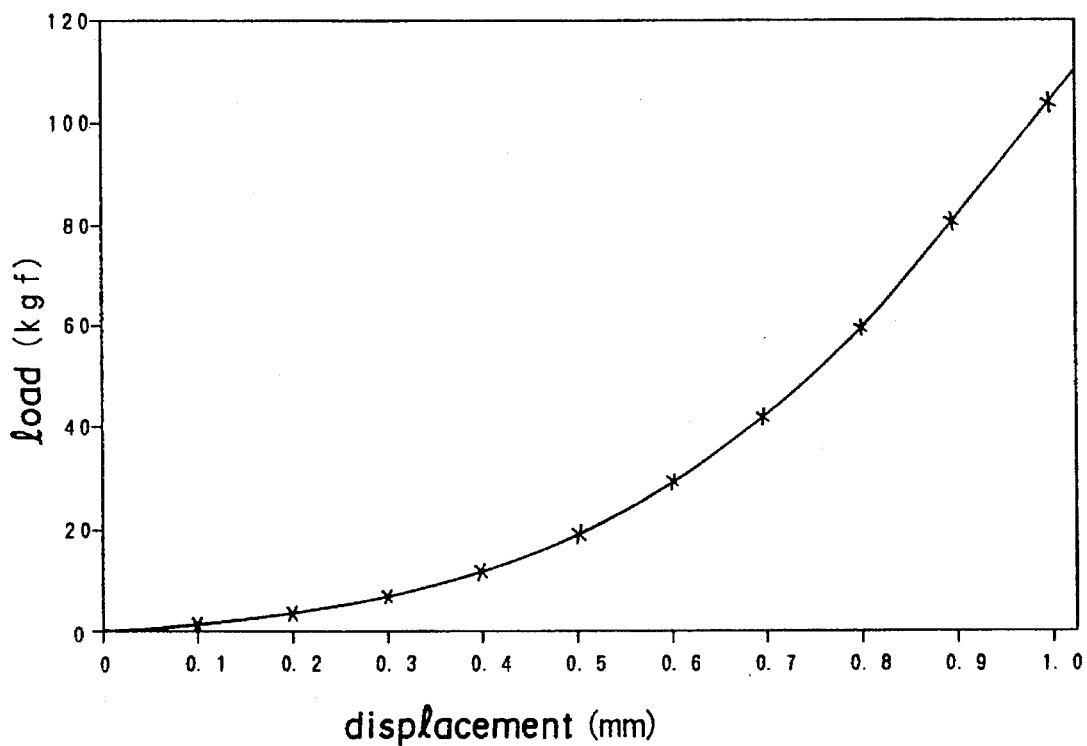
FIG. 3 is a graph illustrating the load-displacement characteristic of a leaf spring as used in the prior art.

FIG. 2 shows the proportional characteristic between displacement and load of disc spring 34. Hence, when the disc spring 34 is displaced by a fixed amount α by the adjusting rod, a load of the disc spring 34 changes by a required amount β. As a result, it is possible to change the damping force on the expanding side of the hydraulic damper 10 produced by the damping valve 19 on the expanding side in proportion to a movement of the adjusting rod 29. This allows the user to easily and positively adjust a damping force on the expanding side of the hydraulic damper 10 to a selected value.

Since the disc spring 34, which is shorter in axial length than a coil spring, is used to exert a biasing force on the damping valve 19 on the expanding side, the disc spring 34 disposed behind the damping valve 19 on the expanding side does not cause the size of the hydraulic damper 10 to increase, thus allowing a compact design of the hydraulic damper 10.

In the above description of the embodiment, the disc spring 34, the cage 33 and the pin 31 are used to change the damping force produced by the damping valve 19 on the expanding side, but the similar construction may be applicable for adjusting the damping force produced by the damping valve 20 on the contracting side.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A damping force adjusting device for dampers, comprising:
    a cylinder capable of being filled with working fluid;
    a piston disposed in said cylinder in a slidable manner to divide the inside of said cylinder into two working chambers and which has passages formed therethrough for connecting the working chambers to each other;
    damping valves on said piston which can close said passages and which can produce a damping force as a result of being deformed in a deflecting manner by the working fluid flowing through said passages;
    a piston rod fixed to said piston and can project outward from said cylinder;
    a disc spring disposed behind said damping valve to exert a biasing force on the rear face thereof; and
    an adjusting rod mounted through said piston rod and linked to said disc spring in an actuating manner to allow a change of the biasing force exerted on said damping valve by said disc spring.

2. A damping force adjusting device for dampers according to claim 1, wherein the passages formed in said piston comprise passages on the expanding side and passages on the contracting side,
    said damping valves comprise a damping valve on the expanding side capable of closing said passages on the expanding side and a damping valve on the contracting side capable of closing said passages on the contracting side, and
    said disc spring being disposed behind said damping valve on the expanding side to exert a biasing force thereon.

3. A damping force adjusting device for dampers according to claim 1, wherein a plurality of said disc springs are disposed one on top of another.

4. A damping force adjusting device for dampers according to claim 2, wherein a plurality of said disc springs are disposed one on top of another.

* * * * *